United States Patent [19]
Pocrnja

[11] 3,992,891
[45] Nov. 23, 1976

[54] PROCESS FOR RECOVERING ENERGY FROM LIQUEFIED GASES

[75] Inventor: Anton Pocrnja, Munich, Germany

[73] Assignee: Linde Aktiengesellschaft, Wiesbaden, Germany

[22] Filed: Feb. 18, 1975

[21] Appl. No.: 550,590

[30] Foreign Application Priority Data

Feb. 16, 1974 Germany............................ 2407617

[52] U.S. Cl............................................. 62/53; 60/648; 60/650; 60/651; 60/684; 62/87; 62/88; 62/401; 62/402
[51] Int. Cl.² ............................................. F17C 7/02
[58] Field of Search ............... 62/52, 53, 86, 87, 88, 62/401, 402, 403; 60/648, 650, 651, 671, 682, 684

[56] References Cited
UNITED STATES PATENTS

| | | | |
|---|---|---|---|
| 3,154,928 | 11/1964 | Harmens................................. | 62/53 |
| 3,183,666 | 5/1965 | Jackson ............................ | 60/648 X |
| 3,293,850 | 12/1966 | Morrison ........................... | 60/650 X |
| 3,668,659 | 12/1962 | Marshall, Jr............................. | 62/52 |

*Primary Examiner*—William E. Wayner
*Assistant Examiner*—Ronald C. Capossela
*Attorney, Agent, or Firm*—Millen, Raptes & White

[57] ABSTRACT

In a process for recovering the energy from a liquefied gas by evaporation in heat exchange with a cycle medium which is simultaneously cooled, said cycle medium being thereafter compressed, heated, subjected to engine expansion and recovered in a cyclical manner, wherein the improvement comprises operating the cycle so that the cycle medium remains in the gaseous phase throughout the entire cycle.

9 Claims, 3 Drawing Figures

PROCESS FOR RECOVERING ENERGY FROM LIQUEFIED GASES

BACKGROUND OF THE INVENTION

This invention relates in general to a process for recovering energy from liquefied gases by evaporation of same in heat exchange with a cycle medium which is simultaneously cooled thereby.

Processes for recovering energy from liquefied natural gas (LNG) are well known. In one of these processes (U.S. Pat. No. 2,937,504, for example), LNG is evaporated in heat exchange with propane serving as the cycle medium, and during this procedure, the propane is liquefied. In another conventional process (U.S. Pat. No. 3,068,659), ethane is used as the cycle medium, which is likewise liquefied by heat exchange with the liquefied natural gas.

In these known processes, a common feature is that the cycle medium, after liquefaction by heat exchange with liquefied natural gas, is compressed by a pump, then expanded and revaporized by being heated with an external source of heat. In such systems, high pressures are necessary to recover the maximum amount of liquefaction energy from the natural gas; in the high-pressure section of the cycle system, these pressures can be, for example, up to 140 bars (U.S. Pat. No. 3,068,659). The use of such high pressures, however, means that the temperature level on the warm side of the cycle system — similarly as in a steam power plant — remains limited and thus the supplied external heat is not used in an optimum manner. Primarily for this reason, none of these prior art processes attains the degree of efficiency of a well designed and operated conventional power plant.

Another substantial disadvantage of these known processes is that they cannot ordinarily stay on stream if the supply of natural gas is interrupted, since the cycle medium cannot be liquefied in a simple manner at ambient temperature.

Still another disadvantage of the conventional method is that the cycle media are all combustible substances, thereby requiring, especially in the high-temperature range, stringent controls and precautions to reduce the explosion hazards to the minimum extent possible.

SUMMARY

An object of this invention is to provide a process wherein the recovery of the liquefaction energy from a liquefied gas is improved, and wherein other disadvantages of the prior art processes are substantially avoided.

Upon further study of the specification and appended claims, further objects and advantages of this invention will become apparent to those skilled in the art.

To attain these objects, a system is provided wherein the cycle medium remains in the gaseous phase even at the lowest temperature in the cycle system. This means that a cycle medium is employed which does not condense under the operating conditions of the process. The cycle medium is also of a non-explosive composition so that it is possible to provide a substantial increase in the temperature difference between the inlet temperatures of the cycle medium at the compressor on the one hand and the turbine on the other hand. This temperature difference can amount, in the process of this invention, at present to up to 1000 K, preferably at least 600 K, more preferably at least 900 K, instead of 200–300 K in the conventional processes. Because of this high temperature difference in the present process, lower cycle pressures can be employed. Furthermore, it is possible to utilize the external heat to a substantially higher degree with a simultaneous optimum exploitation of the refrigeration exergonic characteristic. By "exergonic" is meant the capability of the liquefied gas to do mechanical work, i.e. "exergonic" is the mechanical work which theoretically can be regained from the refrigeration values of the liquefied gas.

By means of the process of this invention, the liquefaction energy can be recovered from a liquefied gas at a higher degree of efficiency than by the known methods. When applying the process of this invention to the recovery of the liquefaction energy of natural gas, it is possible, for example, to regain more than half the liquefaction energy. This is especially important to the purchasers of LNG since energy production costs in natural gas consumer countries are more than twice as high as in natural gas producing countries.

A further advantage of the process of this invention is that its efficiency can be controlled in a simple manner, which can be executed as in any gas turbine with a closed cycle by a simple regulation of the pressure level by varying the gas in the cycle system.

The cycle medium is heated before engine expansion thereof in the turbine, largely by external heat supplied thereto. However, advantageously, part of the heat can also be obtained recuperatively by heat exchange of the cycle medium with itself.

The pressures of the cycle medium are, in dependence on the desired cycle properties and on the type of medium employed, in a preferred embodiment, between 1 and 20 bars in the low-pressure section of the cycle system and between 15 and 60 bars in the high-pressure section, the preferred pressure difference between the low and high sides being about 4 to 6, especially about 10 to 40 bars. However, in special modes of operating the process, it is also possible to employ different pressure relationships. In order to maintain the temperature difference between the warm section and the cold section of the cycle system at a maximum, it is advantageous to control the process so that the cycle medium, prior to its engine expansion, has a temperature of between 800° and 1300° K, preferably being as close as possible to the highest design temperature of the expansion turbines, and to maintain the temperature, prior to compression, as closely as possible at the temperature of the liquid gas to be evaporated, e.g., within about 5°–25° K.

Suitable cycle media primarily gases with approximately the behavior of ideal gases at the intake pressure and temperature of the compressor. Included among such gases are air, and all inert gases, such as nitrogen, neon, helium, and argon. A gas containing over 50% helium is especially suitable as the operating medium.

The liquefied gas to be evaporated, which has been pumped to a high pressure, can be further heated with advantage after its evaporation and can then be engine-expanded. This makes it possible to obtain a further increase in the degree of efficiency of the process according to the present invention. The subsequent heating step can also be executed by heat exchange with the cycle medium after its engine expansion.

An apparatus for conducting the process of this invention, wherein the cycle system includes a heat exchanger for the evaporation of the liquefied gas, an at least one-stage compressor, a recuperator, a heater, and an at least one-stage expansion turbine, is distinguished by the use of a heat exchanger wherein one flow cross section is designed for the evaporation of a liquid gas and the second flow cross section is designed for a gaseous medium, and wherein the compressor is a gas compressor. In this connection, a heater with an associated expansion turbine can advantageously be connected downstream of the flow cross section for the evaporating medium; the heater is either operated by external heat or is designed as a heat exchanger to be used with the cycle medium as the heat carrier.

A preferred field of use for the process of the present invention is the revaporization of natural gas which, at the site where it is obtained, is converted into the liquid phase under expenditure of energy to render its transport less expensive. This liquefied natural gas must be evaporated at its point of destination and fed into the supply network under a certain pressure. It is desirable to be able to recover the liquefaction energy to a maximum extent during this revaporization. This can be acomplished by means of the process of this invention with a surprisingly favorable degree of efficiency.

The cycle system of the process of this invention operates, when recovering the liquefaction energy, similarly to a gas turbine power plant with a closed cycle wherein external heat is converted, for example by the combustion of fuels, into mechanical or electrical energy. However, the cycle system of the present invention differs from a conventional power plant significantly by providing a substantially larger temperature difference between the cold and warm sections of the cycle system, which is one of the most important reasons for the high degree of efficiency of the process according to the present invention.

The idea on which this invention is based, namely to effect the recovery of the liquefaction energy of a gas to be evaporated by means of a cycle medium which always remains in the gaseous phase, thus leads from the viewpoint of gas turbine power plants to a novel type of power plant having a better degree of efficiency than that of conventional power plants utilizing customary water cooling. Therefore, the application of the process of this invention in combination with a nuclear energy reactor as a source of external heat is also of special advantage, because the otherwise troublesome waste heat can thus be exploited advantageously.

In addition to using the process of this invention in the revaporization of liquefied natural gas, it is also possible to utilize the process advantageously in the evaporation of other liquefied gases, e.g. hydrogen, ethane, or ammonia, or in other words, with any fluid having a normal boiling point lower than water, or especially a gas having a boiling point of less than ambient temperature.

In the following Table 1, the process of this invention, as applied to the evaporation of liquefied natural gas, is compared to the prior-art process described hereinabove wherein ethane, which is being liquefied, serves as the cycle medium. As can be seen from the table, a substantial improvement of the degree of efficiency is attained.

TABLE 1

| | Invention | Prior Art (U.S. Pat. 3,068,659) |
|---|---|---|
| Amount in the cycle ($Nm^3$ of cycle medium/ $Nm^3$ of natural gas) | 2.46 | 0.50 |
| Heat requirement Q (KWh/$Nm^3$ natural gas) | 0.469 | 0.363 |
| Obtained energy L (KWh/$Nm^3$ natural gas) | 0.315 | 0.188 |
| Thermal degree of efficiency (L/Q) $\eta$ | 0.671 | 0.518 |
| Thermodynamic degree of efficiency $\eta_{th}$ (L/Q + $\Delta$ E + Lp) | 0.545 | 0.392 |

In case of the thermodynamic degree of efficiency, $\Delta E$ is the exergonic difference between the pressureless liquid natural gas ($E_F$) and the exiting gaseous natural gas ($E_G$) under 70 bars. Lp is the pump efficiency for compressing the natural gas from 1 to 70 bars.

The following Table 2 yields an overview of the operating values of one embodiment of the process according to this invention wherein liquefied natural gas is revaporized. To demonstrate the degree of efficiency of the process of the present invention, these operating values are being compared with rational operating values of a conventional gas turbine power plant of the same capacity with water cooling and two-stage compression. In the conventional plant, a compression in two stages with intermediate cooling is necessary to attain a usable degree of efficiency at all, because of the great pressure ratio, while by means of the process of this invention, an energy gain can already be obtained with one stage.

TABLE 2

| | Invention | Conventional Power Plant |
|---|---|---|
| Throughput of liquid natural gas $V_E$ ($Nm^3/h$) | 100,000 | — |
| Inlet and outlet temperature of the liquid natural gas (K) | 113/283 | — |
| Exergonic property of liquid natural gas, pressureless $E_F$ (KW) | 21,480 | — |
| Exergonic property of gaseous natural gas, 70 bars $E_G$ (KW) | 12,430 | — |
| Pumping power, liquid natural gas $L_p$ (KW) | 460 | |
| Throughput cycle system $V_L$ ($Nm^3/h$) | 246,500 | 246,500 |
| Cycle pressures (bars) | 5/45 | 5/15/45 |
| Compressor inlet and outlet temperatures (K) | 133/271 | 298/429 |
| Fuel heat Q (KW) | 46,927 | 46,927 |
| Heat transformation, heater (Kcal/h) | 40,357,000 | 40,357,000 |
| Heat transformation, recuperator (Kcal/h) | 34,013,000 | 22,226,000 |
| Heat transformation, evaporation of liquid natural gas (Kcal/h) | 13,282,000 | — |
| Heat transformation, water cooler (Kcal/h) | — | 23,231,000 |
| Turbine power $L_T$ (KW) | 43,191 | 43,191 |
| Compressor power $L_V$ (KW) | 11,709 | 23,278 |
| Effective power $L = L_T - L_V$ (KW) | 31,483 | 19,913 |
| Increase in power of the liquid natural gas $\Delta L$ (KW) | 11,570 | — |
| Thermal degree of efficiency $\eta = L/Q$ | 0.671 | 0.424 |
| Thermodynamic degree of efficiency $\eta_{th} =$ L/Q + ($E_F - E_G$) + $L_p$ | 0.558 | 0.424 |
| Degree of exploitation of the consumed exergonic | | |

TABLE 2-continued

| | Invention | Conventional Power Plant |
|---|---|---|
| property of the liquid natural gas (increased output/increased consumption) $\eta_E = \Delta L/(E_F - E_G) + L_P$ | 1.22 | — |

As can be seen from Table 2, the process of this invention results in an increasing of the efficiency of gas turbine power plants having a closed cycle. In this connection, the considerable increase in the temperature difference between the inlets of the compressor and turbine machines could only be achieved in conventional processes heretofore by raising the inlet temperature at the gas turbine which temperature is limited by the properties of the materials. Furthermore, according to the present invention, it is possible to increase the throughput of cycle medium which, in known methods with the same engine size, can only be attained by raising the pressure level. In other words, the compressor work, as shown in the table, with otherwise identical conditions, can be reduced to approximately one-half. Finally, the table shows clearly that the degree of efficiency of the process according to this invention is substantially more favorable than that of the conventional gas turbine power plant and of all other conventional thermal power plants. This is of great economic significance.

DETAILED DESCRIPTION OF THE DRAWINGS

Figure 1:
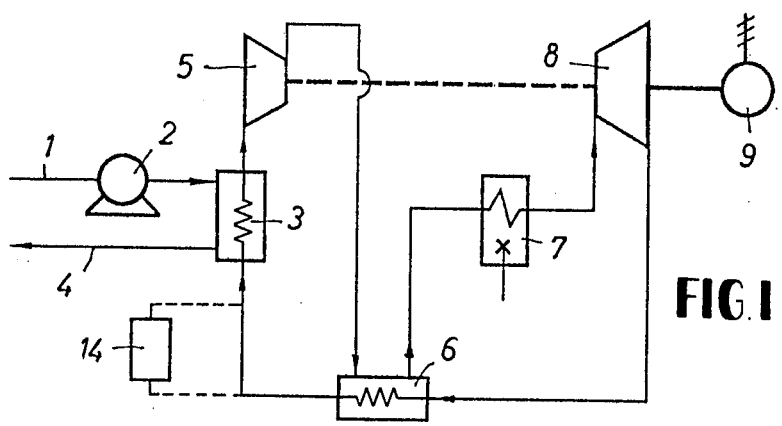
FIGS. 1–3 are schematic views of embodiments of the process according to the present invention which can be utilized, for example, in the revaporization of liquefied natural gas in a natural gas terminal. The parts which are alike in the figures bear identical reference numerals.

In the embodiment shown in FIG. 1, liquid natural gas flows through a conduit 1 under approximately atmospheric pressure from a storage tank, e.g. from a liquefied gas tanker. The pressure of the liquid natural gas is increased to 70 bars by means of the liquid gas pump 2. Downstream of the pump 2, the liquid gas evaporator 3 is arranged from which the natural gas is fed in the gaseous phase via conduit 4 to a natural gas network. At the inlet of the evaporator 3 the liquid natural gas has a temperature of about 113 K, while the temperature of the exiting, evaporated natural gas is about 271 K.

The evaporation of the natural gas takes place in the evaporator 3 against air circulating in a cycle system; the amount of circulated air is 246,500 Nm³/h. The air flowing through the evaporator 3 is greatly cooled but not liquefied during this step, in accordance with the invention. After cooling, the air is compressed to 45 bars in a compressor 5 the power of which is 11,709 KW, heated in a recuperator 6 in heat exchange with itself, and fed to a heater 7. In the heater 7, the air is supplied with an energy of 46,927 KW by external heat, for example by the combustion of a fossil fuel or from a nuclear reactor; during this step, the temperature of the air rises to a maximally permissible value. Thereafter, the very hot air, which can have a temperature higher by above 1000 K than the temperature at the inlet of the compressor 5, is fed to an expansion turbine 8 wherein it is expanded to 5 bars. The turbine 8 can supply a power of 43,191 KW to a generator 9 coupled therewith and to the compressor 5 connected thereto. From the turbine 8, the air flows via the recuperator 6 wherein it is cooled as low as possible, preferably to ambient temperature, and reenters the evaporator 3. Additional numerical data regarding the embodiment shown in FIG. 1 can be seen from Table 2 above.

Figure 2:
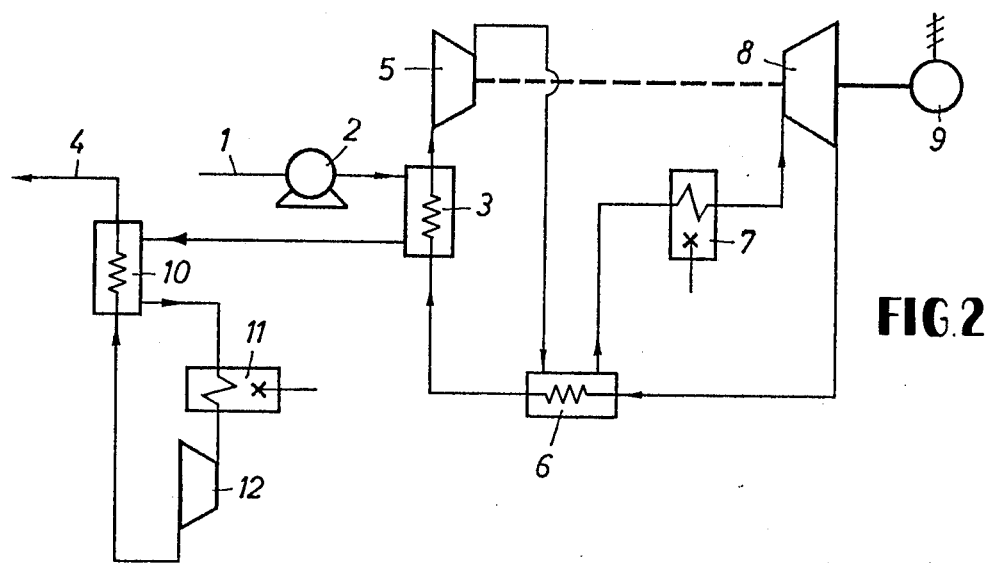

FIG. 2 illustrates an advantageous further development of the process of FIG. 1. In this procedure, the evaporated natural gas flows from the evaporator 3 to a heater 11 by way of a heat exchanger 10; external heat is supplied to the natural gas in the heater 11. Thereafter, the natural gas is expanded in an expansion turbine 12 and fed into the supply network via conduit 4. This arrangement makes it possible to achieve a further increase in efficiency.

Figure 3:
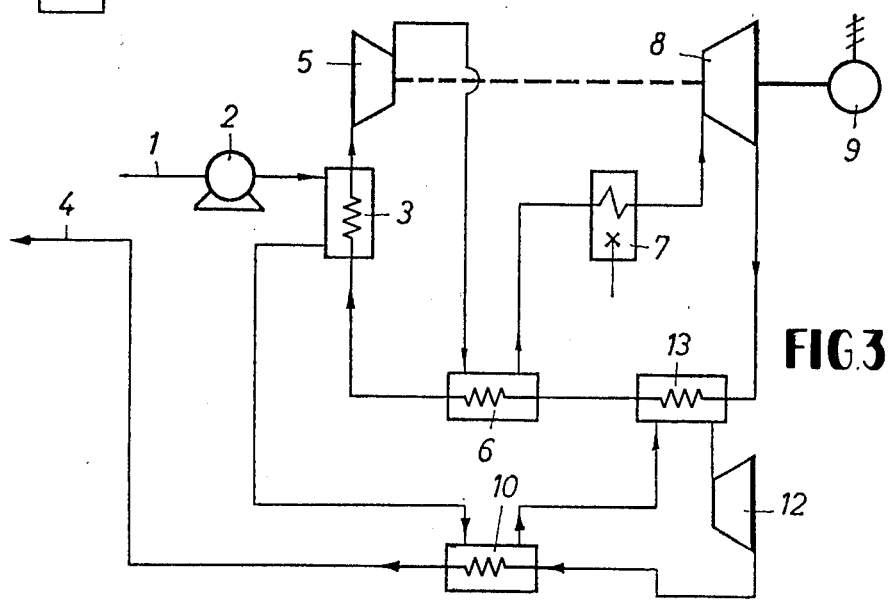

A modification of the process according to FIG. 2 is shown in FIG. 3. In this process, the supply of additional heat to the evaporated natural gas prior to its expansion in the turbine 12 is effected via a further heat exchanger 13 through which flows the air circulating in the cycle system.

The process shown in FIGS. 1–3 can also be operated in the form of a conventional power plant in case no natural gas is available. For this purpose, as indicated in FIG. 1, a water cooler 14 is inserted in the cycle in place of the evaporator 3. With a fluctuating supply of natural gas, it is also possible to connect, additionally to the evaporator 3, a water cooler upstream thereof or in parallel therewith.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. In a process for recovering the energy from a liquefied gas by evaporation in heat exchange with a closed cycle medium which is simultaneously cooled, said cycle medium being thereafter compressed, heated by indirect heat exchange, subjected to engine expansion and recovered in a cyclical manner, the cycle being operated so that the cycle medium remains in the gaseous phase through the entire cycle, wherein the improvement comprises further heating resultant vaporized liquefied gas in indirect heat exchange with said cycle medium after said cycle medium has been engine expanded but before being cooled, and thereafter engine expanding the resultant further heated vaporized liquid.

2. A process according to claim 1, the improvement further comprising heating the cycle medium in part by supplying external heat and in part by heat exchange with itself after expansion thereof.

3. A process according to claim 1, the improvement further comprising maintaining the pressure of the cycle medium just prior to compression at between 1 and 20 bars and just after compression between 15 and 60 bars.

4. A process according to claim 3, the improvement further comprising maintaining the temperature of the cycle medium prior to the engine expansion between 800 and 1300 K, and prior to compression, at about the temperature of the liquefied gas to be evaporated.

5. A process according to claim 1, wherein the cycle medium is air.

6. A process according to claim 1, wherein air is employed as the cycle medium.

7. A process according to claim 1, wherein said liquefied gas is liquefied natural gas.

8. Apparatus for evaporating and further heating liquefied gas comprising:
   A. main heat exchanger for the evaporation of liquefied gas, said main heat exchanger having a first flow cross section for evaporating liquefied gas and a second flow cross section for a gaseous medium;
   B. gas compressor for compressing said gaseous medium, arranged downstream of said second flow cross section of said main heat exchanger;
   C. recuperator for recovering heat of compression of said gaseous medium, arranged downstream of said gas compressor, said recuperator having a first flow cross section for receiving hot gas from said compressor and a second flow cross section for heating said gaseous medium to be sent to said main heat exchanger;
   D. heater means for heating said gas medium leaving said first flow cross section of said recuperator, said heater means being indirect heat exchange means heated by external heat;
   E. expansion turbine for expanding heated gaseous medium and arranged downstream of said heater means;
   F. supplemental heat exchanger for further heating evaporated liquefied gas, said supplemental heat exchanger including a first flow cross section for evaporated liquefied gas and a second flow cross section for cooling resultant expanded gaseous medium, said second flow cross section arranged downstream of said expansion turbine and upstream of said recuperator; and conduit means for effecting communication between components A, B, C, D, E, F as a closed cycle between A and F for the liquefied gas.

9. Apparatus according to claim 8, comprising a further expansion turbine for expanding said further heated expanded liquefied gas, arranged downstream of said first flow cross section of said supplemental heat exchanger, and conduit means for effecting communication between said first flow cross section and said further expansion turbine.

* * * * *